Oct. 20, 1964  R. R. JUNG ETAL  3,153,544
STEERING LINKAGE FOR RETRACTABLE WHEELS
Filed Feb. 1, 1962  3 Sheets-Sheet 2

INVENTORS
MAC R. DOOLITTLE
RICHARD R. JUNG
BY
ATTORNEY

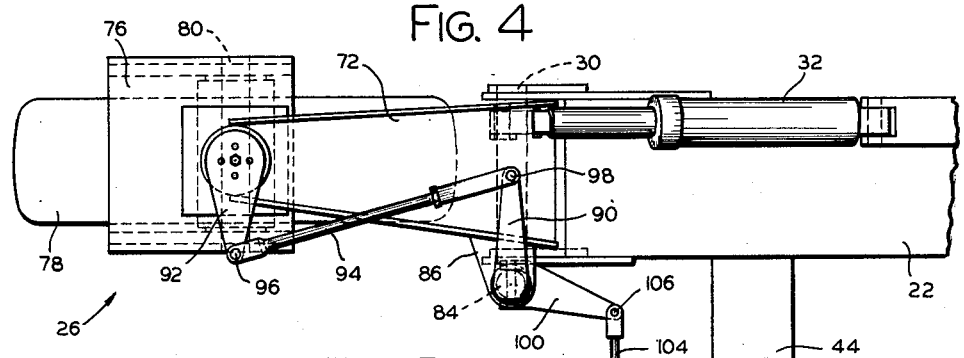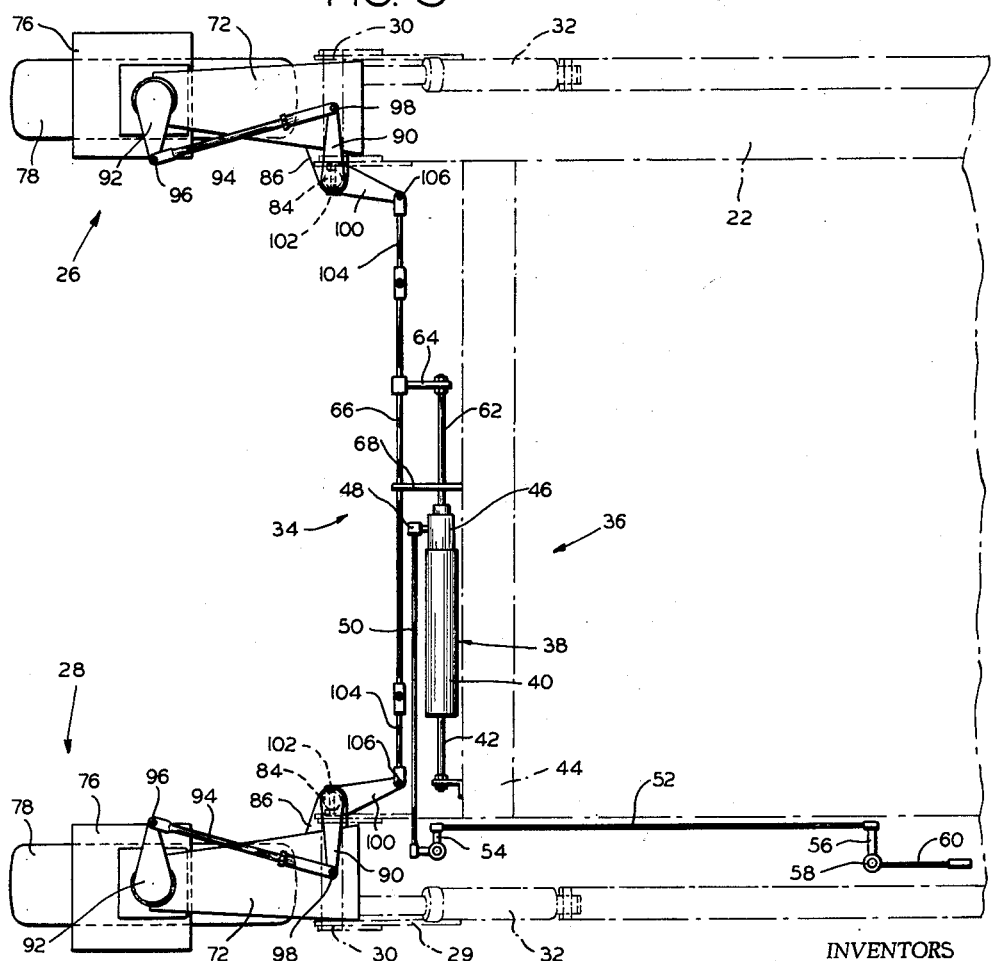

United States Patent Office 3,153,544
Patented Oct. 20, 1964

3,153,544
STEERING LINKAGE FOR RETRACTABLE
WHEELS
Richard R. Jung, Battle Creek, and MacRoger Doolittle,
Lansing, Mich., assignors to Clark Equipment Company, a corporation of Michigan
Filed Feb. 1, 1962, Ser. No. 170,376
5 Claims. (Cl. 280—43.23)

This invention relates to means for steering dirigible wheels, and more specifically to a steering linkage suitable for use with retractable dirigible wheels.

It has been found advantageous in certain types of material handling vehicles to provide the vehicle with a construction such that in material handling operations the wheels of the vehicle can be retracted to permit the vehicle frame to rest upon the ground. This results in greatly increased stability of the vehicle during such handling operations that may entail, for example, supporting the material being handled transversely outwardly of the vehicle envelope.

A principal object of our invention is to provide improved means for steering retractable dirigible wheels.

A further object of our invention is to provide a simple, low-cost and relatively trouble-free steering means for retractable dirigible wheels.

In carrying out our invention in a preferred embodiment we provide in conjunction with a pair of retractable wheel assemblies a steering linkage. Each wheel assembly includes a main support member connected to an elongated vehicle frame for pivotal movement about a transverse axis and a bifurcated wheel support member connected to the main support member for pivotal movement about a vertical axis. The steering linkage includes a pair of vertically disposed elongated rods connected respectively to the main support members for pivotal movement about longitudinal axes of the rods and means connecting the upper ends of the respective rods and wheel support members for transmitting pivotal movement therebetween. Pivotally connected to the lower end of the respective rods for movement about a transverse axis is a pair of horizontally extending arms. These arms are connected by link means so that rectilinear movement of the link means causes the arms to move in horizontally disposed arcs in the same direction.

The above objects and other objects, features and advantages of our invention will become more readily apparent when the detailed description which follows is taken in conjunction with the drawing wherein:

FIGURE 4 is a plan view of the wheel assembly and steering linkage shown in FIG. 2; and FIGURE 5 is a plan view of the entire steering assembly at one end of the vehicle showing parts of the vehicle in phantom.

Figure 1:
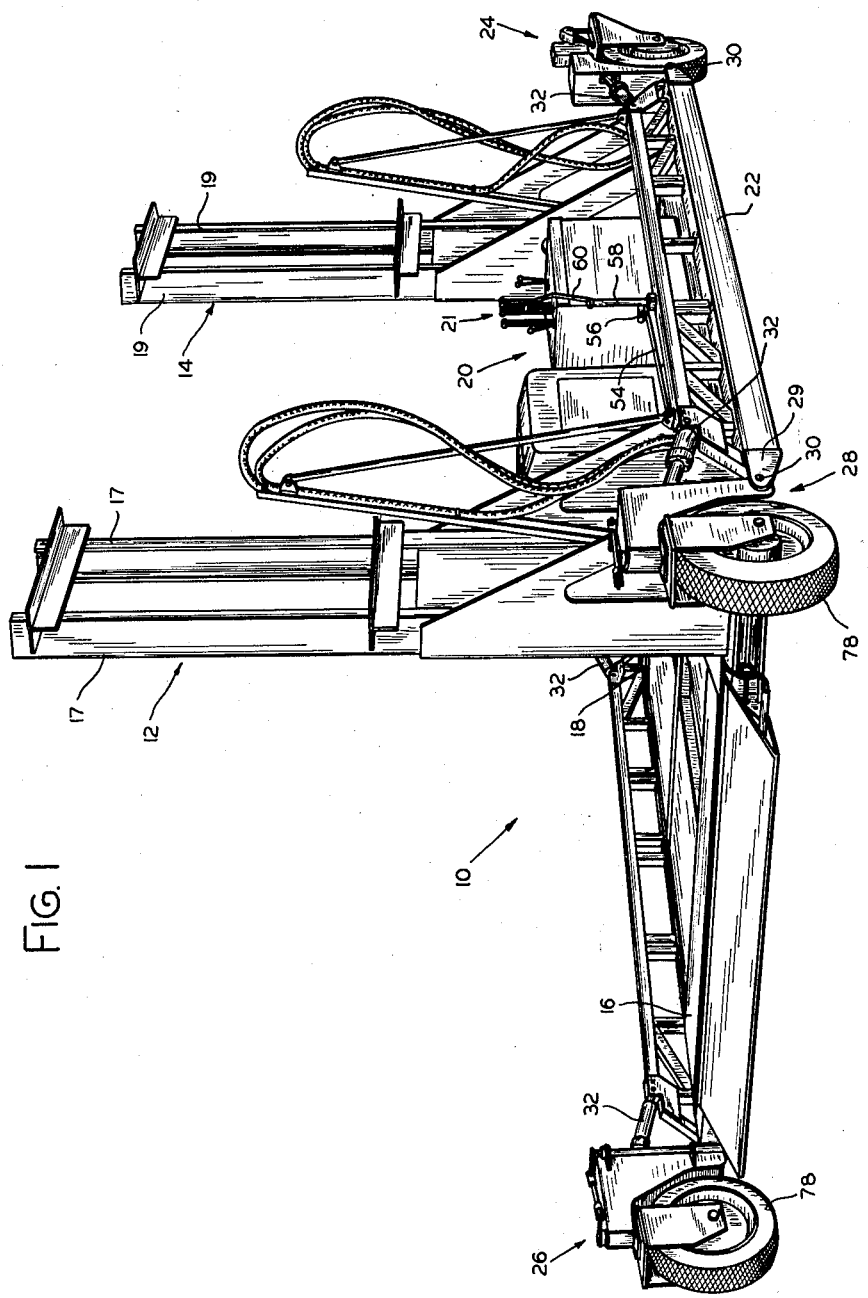
FIGURE 1 is a perspective view of a material handling vehicle which embodies our invention.

Referring now to FIG. 1, the reference numeral 10 denotes a side transfer material handling vehicle having a pair of lift uprights 12 and 14 movable transversely of the vehicle by power actuators, not shown, from a position adjacent one side thereof to a position adjacent the other side thereof. Lift uprights 12 and 14 include, respectively, load engaging members 16 and 18 arranged for vertical reciprocal movement in vertical channel members 17 and 19 by power actuators, not shown. Vehicle 10 includes an operator's station 20 located on one side and centrally of an elongated frame 22, which also supports the lift uprights 12 and 14, at which is located various controls 21 necessary to operate the vehicle in all phases of its material handling capabilities. Frame 22 is supported at the rear end thereof by a pair of retractable drive wheel assemblies 24 (only one of which is shown). The front end of frame 22 is supported by means of another pair of retractable dirigible wheel assemblies 26 and 28. The various wheel assemblies are pivotally connected to brackets or bifurcated corner extensions 29 of frame 22 by means of transversely extending stub shafts 30, and are actuated between a lowered position (FIGS. 1 and 2) and a raised or retracted position (FIG. 3) by means of fluid motor actuators 32 connected pivotally, as shown, between the respective wheel assemblies and the vehicle frame.

The above described vehicle may, for example, be used to load trailers of various types, such as vans and automobile carriers onto railroad flat cars from the side thereof, and also to unload them. In order to accomplish such loading and unloading it is necessary during a portion of the operation to support the trailer or other load which is carried on load engaging members 16 and 18 laterally outwardly of and above vehicle frame 22. When the load being handled is in this position the vehicle is in an unstable condition. In order to improve overall stability of the vehicle, wheel assemblies 24, 26 and 28 are made retractable so that during loading and unloading operations the vehicle frame 22 is at rest on the ground. Since wheel assemblies 26 and 28 are dirigible, as well as retractable, it is desirable to provide a steering linkage 34 which is not affected by retraction of the wheel assemblies.

Making reference now also to FIG. 5, this steering linkage 34 is a part of the power steering system 36 which includes the double acting fluid actuator 38. The double acting fluid actuator 38 includes a cylinder 40 within which is slidably disposed a piston (not shown). A piston rod 42, which is connected to the piston at one side, extends outwardly through one end of cylinder 40 and is connected at its other end to a transverse member 44 of frame 22. Connected to the other end of cylinder 40 is a control valve body 46 within which is disposed a valve spool (not shown) which is actuatable by a control ball stud 48 which in turn is actuatable rectilinearly by links 50 and 52 which are connected at adjacent ends by a bell crank 54 pivotally mounted on frame 22, the end of link 50 opposite bell crank 54 being connected to ball stud 48 and the end of link 52 opposite bell crank 54 being connected to an arm 56. Arm 56 is secured adjacent the bottom of a vertical rod 58 which is mounted on frame 22 for pivotal movement about its vertical axis and has secured adjacent the upper end thereof an operator's steering handle 60. At this point it will be clear that arcuate movement of steering handle 60 causes substantially rectilinear movement of links 50 and 52 by way of arm 56 and bell crank 54 which results in rectilinear movement of ball stud 48 and hence the valve spool, thereby controlling the flow of pressure fluid into and out of actuator 38. The structure and operation of actuator 38, the valve spool, and ball stud 48 are conventional, and so the fluid circuitry associated with fluid actuator 38 has not been shown or described since it is not required to facilitate understanding of the present invention. For an example of such mechanism see U.S. Patent No. 2,755,627. Steering linkage 34 is connected to control valve 46 by means of a rod 62 connected at one end to valve 46 and at the other end to one end of a rigid arm 64 which is connected at its other end to a main connecting link 66. It will be noted at this point that rod 62 and link 66 are both slidably supported in a support plate 68 which is secured to frame member 44 so that connecting link 66 always moves rectilinearly along the same path.

Figure 2:
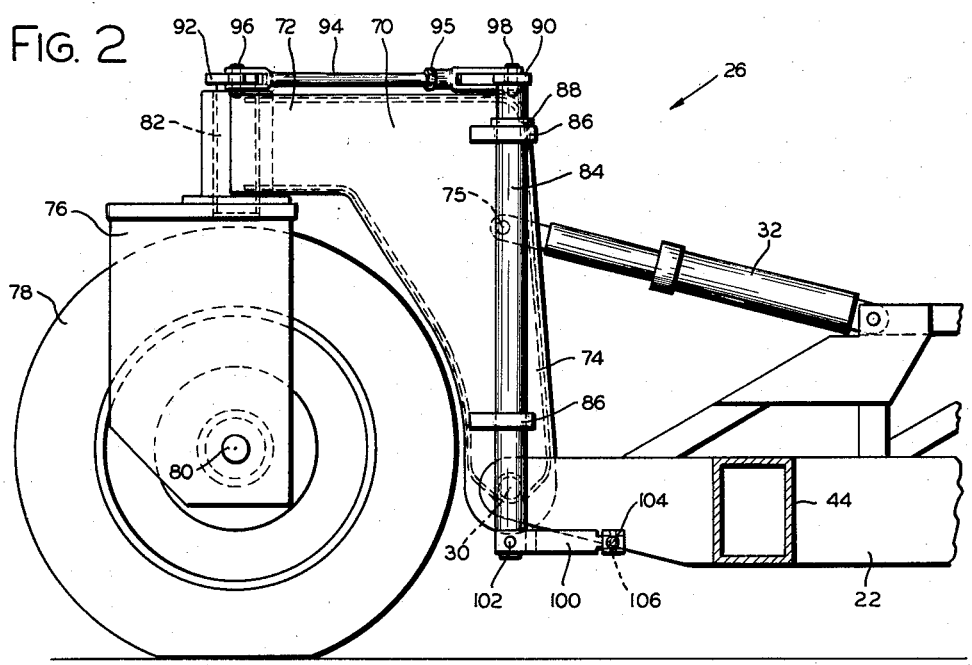
FIGURE 2 is a fragmentary side elevation on an enlarged scale showing one of the retractable dirigible wheel assemblies and the associated steering linkage.
Figure 3:
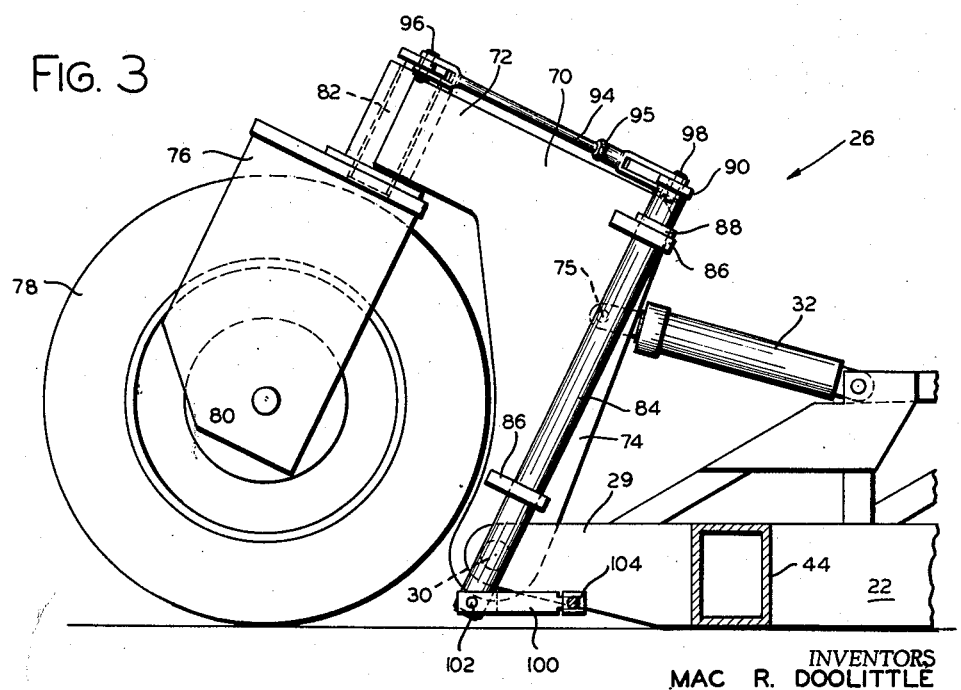
FIGURE 3 is similar to FIG. 2 except that the wheel assembly is shown in a retracted position.

Referring now also to FIGS. 2 through 4, only wheel assembly 26 and the steering linkage associated therewith will be described in detail, like reference numerals being applied to like parts of wheel assembly 28, because wheel assemblies 26 and 28 and the associated steering linkage are allochiral duplicates. Wheel assembly 26 includes a main support member 70 of hollow welded plate construction. Main support member 70 is generally of inverted L-shape having a horizontal leg 72 and a vertical leg 74. The lower end of vertical leg 74 is pivotally connected to frame 22 adjacent the forward end of bracket 29 by the stub shaft 30. It will also be noted that one end of fluid actuator 32 is pivotally connected to main support member 70 at numeral 75 so that wheel assembly 26 may be actuated between the position shown in FIG. 2 and the position shown in FIG. 3. Wheel assembly 26 further includes a downwardly extending bifurcated wheel support bracket 76 having a wheel 78 mounted therein for rotation about a horizontally disposed shaft 80. Bracket 76 is connected to main support member 70 for pivotal movement about a vertically disposed axis by means of a vertically disposed shaft 82 secured at one end thereof to the bight portion of bracket 76 and journalled for rotation in the outer end of leg 72 of main support member 70.

Returning now to steering linkage 34, the portion of the steering linkage associated directly with wheel assembly 26 includes an elongated annular rod 84 mounted on vertical leg 74 in normally vertically disposed relation for pivotal movement about its longitudinal axis by means of a pair of vertically spaced, inwardly extending brackets 86 through which it passes. A ring 88 is secured to rod 84 and cooperates with the upper side of the upper one of brackets 86 to prevent rod 84 from sliding downwardly through brackets 86. A horizontally disposed, outwardly extending arm 90 is secured adjacent the upper end of rod 84. A similar arm 92 which extends inwardly of the frame 22 is secured to the shaft 82 adjacent the upper end thereof. Arms 90 and 92 are connected by means of a link 94. Link 94 is pivotally connected to arm 92 by means of a pin and bracket connection 96. Likewise link 94 is pivotally connected to arm 90 by means of a pin and bracket connection 98. The bracket portion of the pin and bracket connection 98 threadably engages link 94 at numeral 95 so that the effective length of link 94 can be varied, thus providing a toe in adjustment for wheel 78. The arrangement of arms 90 and 92 and link 94 is such that pivotal movement of rod 84 in one direction causes a pivotal movement of wheel 78 in the opposite direction. A rearwardly extending, horizontally disposed arm 100 is connected at one end thereof to the lower end of rod 84 by means of a transversely extending pin 102 for pivotal movement about a transversely extending axis. The other end of arm 100 is pivotally connected to one end of a link 104 by means of a vertically disposed pin 106. The other end of link 104 is pivotally connected to the adjacent end of link 66.

Bearing in mind that wheel assemblies 26 and 28 together with the associated steering linkage are allochiral duplicates, it will be appreciated that rectilinear movement of link 66 during operation of fluid actuator 38 will change the steering angle of wheels 78 to steer the vehicle either to the left or right, as desired. Further, it will be noted that whether the wheel assemblies are in the extended position shown in FIG. 2, wherein frame 22 is supported above the ground, or in the retracted position shown in FIG. 3, wherein frame 22 is resting on the ground, there is no interference with the operation of steering linkage 34.

Although only one preferred embodiment of our invention has been described in detail, it will be apparent to persons skilled in the art that various changes and modifications in the structure and relative arrangement of parts may be made without departing from the spirit and scope of the invention as defined in the claims appended.

We claim:

1. For use with a vehicle having an elongated frame, a main support member connected to the frame for pivotal movement about a transverse axis and a wheel support member connected to the main support member for pivotal movement about a steering axis, a steering linkage comprising an upwardly extending rod means connected to the main support member for pivotal movement about its longitudinal axis, means connecting said rod and the wheel support member for transmitting pivotal movement from said rod to the wheel support member, arm means connected to said rod adjacent said transverse axis for pivotal movement about an axis transverse of the vehicle, and actuating means connected to said arm means.

2. For use with a vehicle having an elongated frame, a retractable wheel assembly, the retractable wheel assembly including an inverted generally L-shaped main support member, the main support member having a horizontal leg and a vertical leg, and a wheel support member connected to the horizontal leg for pivotal movement about a vertical axis, a steering linkage comprising a vertically disposed rod connected to the vertical leg for pivotal movement about the longitudinal axis of said rod, means connecting said rod and wheel support member for transmitting pivotal movement from said rod to the wheel support member, an arm connected at one end to said rod adjacent the lower end thereof for pivotal movement about a transverse axis, and means connected to said arm for actuating said arm through a horizontally disposed arc.

3. In combination with a vehicle having an elongated frame, a dirigible wheel assembly connected to the frame for pivotal movement about a transverse axis, said assembly including an inverted L-shaped main support member having a horizontal leg and a vertical leg, a wheel support member and a vertically disposed shaft secured to the upper end of said wheel support member and rotatably journaled in said horizontal leg so that said wheel support member is pivotal about a vertical axis, a vertically disposed elongated rod connected to said vertical leg for pivotal movement about the longitudinal axis of said rod, a first horizontally disposed arm secured to said rod adjacent the upper end thereof, a second horizontally disposed arm secured to the upper end of said shaft, a link connecting said arms so that pivotal movement of said rod is transferred to said wheel support member, a third horizontally disposed arm connected to said rod adjacent the pivotal connection of said assembly to said frame for pivotal movement about a transverse axis, and means for actuating said third arm through a horizontally disposed arc.

4. In combination with a vehicle having an elongated frame, a pair of retractable dirigible wheel assemblies connected to the frame for pivotal movement about a transverse axis, each one of said assemblies including an inverted generally L-shaped main support member having a horizontal leg and a vertical leg, a wheel support member and a vertically disposed shaft secured to the upper end of said wheel support member and rotatably journaled in said horizontal leg so that said wheel support member is pivotal about a vertical axis, steering linkage connecting said wheel support members, said steering linkage including a pair of vertically disposed elongated rods connected to respective ones of said vertical legs for pivotal movement about the longitudinal axis of each rod, a first pair of horizontally disposed arms secured to the respective rods adjacent the upper ends thereof, a second pair of horizontally disposed arms secured to the upper ends of the respective shafts, a pair of links connecting respective pairs of said arms so that pivotal movement of said rods is transferred to the respective wheel support members, a third pair of horizontally disposed, longitudinally extending arms connected to the respective rods adjacent the lower end thereof for pivotal movement about a transverse axis, a pair of links pivotally connected at one end thereof to respective ones of said third arms, another link pivotally connected at opposite ends to the other ends of said last-mentioned links, and means for moving said last-mentioned link rectilinearly along its longitudinal axis.

5. In combination with a vehicle having an elongated frame, a retractable dirigible wheel assembly connected to the frame for pivotal movement about a transverse axis, said assembly including first support means and second support means rotatably journaled in said first support means so that said second support means is pivotal about a vertical axis, a vertically disposed elongated rod connected to said first support means for pivotal movement about the longitudinal axis of said rod, means connecting said rod and said second support means so that pivotal movement of said rod is transferred to said second support means, a horizontally disposed arm connected to said rod adjacent the lower end thereof and adjacent said transverse axis for pivotal movement about a transverse axis, and means for actuating said arm through a horizontally disposed arc.

References Cited in the file of this patent

UNITED STATES PATENTS

| | | |
|---|---|---|
| 1,987,791 | Opolo | Jan. 15, 1935 |
| 2,191,961 | Howell | Feb. 27, 1940 |
| 2,479,339 | Gair | Aug. 16, 1949 |
| 2,522,068 | Stallard | Sept. 12, 1950 |
| 3,009,711 | White | Nov. 21, 1961 |